United States Patent [19]

Freeman et al.

[11] Patent Number: 5,393,868

[45] Date of Patent: Feb. 28, 1995

[54] PRODUCTION OF POLYSUCCINIMIDE BY THERMAL POLYMERIZATION OF MALEAMIC ACID

[75] Inventors: Michael B. Freeman, Harleysville, Pa.; Yi H. Paik, Princeton, N.J.; Ethan S. Simon, Ambler; Graham Swift, Blue Bell, both of Pa.

[73] Assignee: Rohm and Haas Company, Philadelphia, Pa.

[21] Appl. No.: 960,070

[22] Filed: Oct. 13, 1992

[51] Int. Cl.$^6$ ............................................. C08F 6/00
[52] U.S. Cl. ............................ 528/480; 528/322; 528/328; 528/345; 528/363; 528/367; 526/204; 526/210; 526/212; 526/213; 526/225; 526/304
[58] Field of Search ............... 526/304, 204, 210, 212, 526/213, 225; 528/322, 328, 345, 480, 363, 367

[56] References Cited

U.S. PATENT DOCUMENTS

| | | | |
|---|---|---|---|
| 3,052,655 | 9/1962 | Fox et al. | |
| 3,846,380 | 11/1974 | Fujimoto et al. | |
| 3,923,751 | 12/1975 | Iwashita et al. | |
| 4,590,260 | 5/1986 | Harada et al. | 528/328 |
| 4,594,409 | 6/1986 | Hayashi et al. | 528/328 |
| 4,696,981 | 9/1987 | Harada et al. | 525/382.2 |
| 4,839,461 | 6/1989 | Boehmke | 528/363 |
| 5,057,597 | 10/1991 | Koskan . | |
| 5,062,980 | 11/1991 | Migdal | 252/51.5 |
| 5,142,062 | 8/1992 | Knebel et al. | 548/545 |
| 5,219,952 | 6/1993 | Koskan et al. | 528/363 |
| 5,221,733 | 6/1993 | Koskan et al. | 528/363 |
| 5,266,305 | 11/1993 | Wood et al. | 424/54 |
| 5,284,512 | 2/1994 | Koskan et al. | 252/363.5 |
| 5,286,799 | 2/1994 | Harrison et al. | 525/285 |
| 5,286,810 | 2/1994 | Wood | 525/421 |
| 5,288,783 | 2/1994 | Wood | 525/418 |
| 5,296,578 | 3/1994 | Koskan et al. | 528/363 |

FOREIGN PATENT DOCUMENTS

| | | |
|---|---|---|
| 511037 | 10/1992 | European Pat. Off. . |
| 9394 | 4/1969 | Japan . |
| 8873 | 3/1977 | Japan . |
| 270735 | 11/1988 | Japan . |
| 1404814 | 9/1975 | United Kingdom . |

OTHER PUBLICATIONS

Harada, K., "Polycondensation of Thermal Precursors of Aspartic Acid", Journal of Organic Chemistry, pp. 1662–1666, Publ. Mar. 25, 1959.

Abstract of European Patent Application No. 0511037, Published Oct. 28, 1992.

*Primary Examiner*—Samuel A. Acquah
*Assistant Examiner*—Hampton-Hightower, P.
*Attorney, Agent, or Firm*—David T. Banchik

[57] ABSTRACT

A method for producing polysuccinimide is provided. Thermal polymerization of maleamic acid at a temperature of from about 160° C. to about 330° C. produces polysuccinimide. The reaction is optionally conducted in the presence of one or more processing aids, solvents or diluents. The polysuccinimide is particularly useful as a detergent additive.

4 Claims, No Drawings

PRODUCTION OF POLYSUCCINIMIDE BY THERMAL POLYMERIZATION OF MALEAMIC ACID

FIELD OF THE INVENTION

The present invention relates to a process for preparing polysuccinimide by the thermal polymerization of maleamic acid. This invention also relates to the use of polysuccinimide prepared from the thermal polymerization of maleamic acid as a detergent additive.

BACKGROUND OF THE INVENTION

Polysuccinimide is useful as a precursor for the preparation of poly(aspartic acid). Both polysuccinimide and poly(aspartic acid) are useful as scale inhibitors, detergents, pigment and mineral dispersants, additives for fertilizers, and corrosion and scale inhibitors in boilers and cooling towers. Several processes are known for the production of polysuccinimide. However, the known methods for the synthesis of polysuccinimide are complex, expensive, or require excessively long process times. The expense of these processes may be a result of the starting material used, the process conditions, or the recovery steps.

One method for the synthesis of anhydropoly(aspartic acid), also known as polysuccinimide, is disclosed in U.S. Pat. No. 5,057,597 to Koskan. This process uses aspartic acid as a starting material, and requires fluidizing the aspartic acid by agitation in a nitrogen atmosphere at a temperature of at least 180° C for three to six hours. The resultant anhydropoly(amino acid) is then hydrolyzed to poly(aspartic acid).

U.S. Pat. No. 4,590,260 to Harada, et al. discloses a process for preparing copoly(amino acids) by admixing at least one species of amino acid with at least one compound selected from the group consisting of an ammonium salt of maleic, maleic or fumaric acid, or that of the monoamide thereof; or maleic, maleic or fumaric acid monoamide or diamide; and subjecting the mixture to thermal polycondensation and then hydrolysis.

U.S. Pat. No. 4,696,981 to Harada, et al. discloses a process for preparing homopoly(amino acids) by the application of microwaves to a mixture of one or more kinds of monoammonium, diammonium, monoamide, diamide or monoamideammonium salts of maleic acid and/or maleic acid and/or fumaric acid. The resulting poly(amino acid) imide is then hydrolyzed to form the corresponding poly(amino acid).

Japanese Patent Number 44-09394B to Kobayashi, et al. discloses a process for preparing polysuccinimide by the polymerization of maleimide in the presence of a basic catalyst and a vinyl polymerization inhibitor.

U.S. Pat. No. 3,923,751 to Iwashita, et al. discloses a process for preparing poly(amino acids) by polymerizing amino acid halide salt in a non-polar organic solvent in the absence of a base. The amino acid halide salts include amino acid chloride hydrochlorides and amino acid bromide hydrobromides.

Japanese Patent Number 52-08873B to Ariyoshi, et al. discloses a process for preparing poly(aspartic acid) by polymerizing the hydrohalic salts of aspartic acid anhydride, optionally in a non-polar organic solvent.

A method for the synthesis of poly(aspartic acid) from the ammonium salt of maleic acid is disclosed in U.S. Pat. No. 4,839,461 to Boehmke. This process is carried out by heating maleic acid or maleic anhydride, which changes into maleic acid while being heated with water, and ammonia to give a dry melt of the monoammonium to biammonium salts which, if the temperature is raised is converted at 120° to 150° C. into poly(aspartic acid). The maleic acid and ammonia are reacted in a molar ratio of 1:1–1.5. The mixture is then heated to 120°–150° C. and the resulting solution of ammonium salt of maleic acid is evaporated, leaving a crystal mash. The crystal mash is then melted, during which time the waters of condensation and crystallization distill off. A porous mass of poly(aspartic acid) results. The entire process requires six to eight hours to complete.

These known methods for the synthesis of polysuccinimide are time consuming, complex, expensive and inefficient.

It is an object of this invention to provide a process for producing polysuccinimide by the thermal polymerization of maleamic acid.

SUMMARY OF THE INVENTION

The present invention provides a process for producing polysuccinimide by heating maleamic acid to a temperature of from about 160° to about 330° C.

DETAILED DESCRIPTION OF THE INVENTION

The process of the present invention is the thermal polymerization of maleamic acid to produce polysuccinimide. Polysuccinimide can be produced by heating maleamic acid, or a solution or suspension of maleamic acid. The process of the present invention is conducted at a temperature of from about 160° C. to about 330° C., preferably from about 165° C. to 280° C.

Maleamic acid has the following structure:

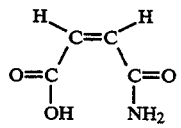

Maleamic acid can be prepared, for example, by heating the monoammonium salt of maleic acid. Maleamic acid can also be prepared by reacting maleic anhydride with anhydrous ammonia, either neat or in an organic solvent such as toluene. We have found that when maleamic acid, or a suspension or solution thereof, is heated to about 160° C. to about 330° C., polysuccinimide is formed. It is believed, although the present invention is not intended to be limited thereby, that the mechanism by which polysuccinimide is formed during the thermal polymerization of maleamic acid is via (a) the Michael-type addition of the —NH₂ group of one maleamic acid molecule into the double bond of a second maleamic acid molecule, and (b) the loss of water due to cyclization of the acid group and the —NH group. The resulting polysuccinimide, thus contains repeating units of the formula:

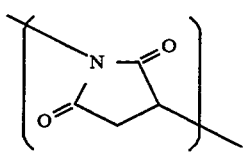

Maleamic acid is a solid material which when heated at a temperature of from about 160° C. to about 330° C.

undergoes a reaction to form polysuccinimide. Polysuccinimide formation occurs rapidly in this temperature range. The thermal polymerization can be conducted over 7 hours or more without detriment to the product, although it is more economical to conduct the reaction for from about 2 minutes to about 6 hours, most preferably from about 5 minutes to about 5 hours. As the reaction proceeds at this temperature, the maleamic acid undergoes several phase changes on its way to forming polysuccinimide. The maleamic acid changes from a white powder, to a yellowish powder, to a viscous melt, to a taffy-like mass, to a friable foamed solid, to powdered polysuccinimide. As the reaction proceeds from the taffy-like mass, foaming is observed.

In one embodiment of the present invention, the thermal polymerization of maleamic acid is conducted using any conventional equipment which is capable of heating the maleamic acid to a temperature of from about 160° C. to about 330° C. for up to about 7 hours. Suitable equipment for the thermal polymerization reaction of maleamic acid includes ovens, belt dryers, drum dryers, agitated vessels, tray dryers, extruders, scraped wall reactors, double planetary mixers, interplanetary mixers, turbodryers, fluidized bed dryers, screw conveyor devices, concurrent and countercurrent solids conveyor mixers, ribbon blenders, calciners and kiln dryers. In an alternative embodiment of the present invention, two or more pieces of equipment are used to heat the maleamic acid to a temperature of from about 160° C. to about 330° C. For example, one piece of equipment may be more suited to handling the reaction as it proceeds through the foaming phase, while another piece of equipment might be more efficient at maintaining the reaction at the elevated temperatures until the reaction is completed. In general, it is desirable to utilize equipment which agitates the heated maleamic acid, thus minimizing the foaming which is observed as the reaction proceeds from the taffy-like phase. The thermal polymerization of the maleamic acid can be conducted at subatmospheric pressure, atmospheric pressure, or supraatmospheric pressure. It is preferred to conduct the thermal polymerization reaction at atmospheric or subatmospheric pressure because the removal of the water which is liberated during the course of the reaction is facilitated. The thermal polymerization reaction can be conducted in an atmosphere of nitrogen, air, ammonia, carbon dioxide, or other inert gases.

In another embodiment of the present invention, the thermal polymerization of maleamic acid is conducted in the presence of one or more processing aids using any conventional equipment which is capable of heating the maleamic acid to a temperature of from about 160° C. to about 330° C. for up to about 7 hours. The processing aids may help to reduce the level of foaming which is otherwise observed as the reaction proceeds from the taffy-like mass. The processing aids may further act to increase heat-transfer, reduce viscosity of the reacting mixture, or enhance the removal of the water liberated from the condensation. Suitable processing aids include zeolites, sulfates, carbonates, silicates, clays, glass beads, polymeric granules and polycarboxylates. Preferred processing aids include zeolite, sodium sulfate, sodium silicate, silica gel, magnesium stearate, alkylnaphthalenesulfonates, citric acid and polysuccinimide.

When used, the one or more processing aids may be present at a level which provides a weight ratio of maleamic acid to processing aid of from about 100:1 to about 1:100, preferably from about 1:50 to about 50:1.

The one or more processing aids, if used, may be mixed with the maleamic acid before or during the thermal polymerization reaction. Preferably, the one or more processing aids are added to the reaction before the onset of foaming is observed.

As in the thermal polymerization of the maleamic acid alone, processes utilizing one or more processing aids can be conducted at subatmospheric pressure, atmospheric pressure, or supraatmospheric pressure. It is preferred to conduct the thermal polymerization reaction at atmospheric or subatmospheric pressure because the removal of the water which is liberated during the course of the reaction is facilitated. The thermal polymerization reaction can be conducted in an atmosphere of nitrogen, air, ammonia, carbon dioxide, or other inert gases.

In another embodiment of the present invention, the thermal polymerization of maleamic acid is conducted in the presence of one or more diluents which are capable of suspending the polysuccinimide which is formed, using any conventional equipment which is capable of heating the suspension to a temperature of from about 160° C. to about 330° C. for up to about 7 hours. Suitable diluents, or suspending agents, are surfactants and other high-boiling organic materials which are fluid under the reaction conditions and in which maleamic acid is not soluble. Suitable diluents are, for example, tetrahydronaphthalene, anionic surfactants, cationic surfactants, zwitterionic surfactants and poly(alkylene glycols).

In another embodiment of the present invention, the thermal polymerization of maleamic acid is conducted in the presence of one or more solvents which are capable of dissolving the polysuccinimide which is formed, using any conventional equipment which is capable of heating the solution to a temperature of from about 160° C. to about 330° C. for up to about 7 hours. Suitable solvents include, for example, N-methylpyrrolidinone, sulfolane, dimethyl sulfoxide, and dimethylformamide.

When the process of the present invention is conducted as a suspension or solution of maleamic acid, the suspension or solution will generally contain from about 5 to about 95 percent by weight maleamic acid, preferably from about 10 to about 75 percent by weight maleamic acid.

The thermal polymerization of maleamic acid as a suspension or dispersion can be conducted at subatmospheric pressure, atmospheric pressure, or supraatmospheric pressure. It is preferred to conduct the thermal polymerization reaction at atmospheric or subatmospheric pressure because the removal of the water which is liberated during the course of the reaction is facilitated. However, if a volatile suspending agent or solvent is used, it may be necessary to conduct the reaction under supraatmospheric pressure to achieve the required reaction temperature. The thermal polymerization reaction of maleamic acid as a suspension or solution can be conducted in an atmosphere of nitrogen, air, ammonia, carbon dioxide, or other inert gases.

The following examples are embodiments of the general process discussed hereinabove and are intended by way of illustration only and are not intended to limit the invention in any way. The weight average molecular weights ($M_w$) and number average molecular weights ($M_n$) are measured by aqueous gel permeation chromatography (G.P.C.) relative to a 4,500 Mw poly(acrylic acid) standard. $^1$H NMR spectroscopy confirmed the identity of the product as polysuccinimide in each of the following examples.

Thermal Polymerization of Maleamic Acid in an Oven to form Polysuccinimide

EXAMPLES 1-11

5 grams of maleamic acid was placed in a glass beaker. The bed depth of the maleamic acid was about 0.5 centimeters. The beaker was placed in a muffle furnace at atmospheric pressure preheated to a selected temperature. After a predetermined amount of time at the selected temperature, the beaker was removed from the oven. The data for these time/temperature studies appear in Table II below.

Thermal Polymerization of Maleamic Acid in a Heated/Agitated Vessel to form Polysuccinimide

EXAMPLE 12-24

To a 100-milliliter glass reaction kettle equipped with mechanical stirring and an inlet for nitrogen was charged with 10 grams of maleamic acid. The stirrer was turned on, a sweep of nitrogen through the flask was begun and the flask was immersed in an oil bath preheated to a selected temperature. The contents of the kettle were stirred while maintaining the temperature of the oil bath for a predetermined amount of time. The contents of the kettle were allowed to cool to room temperature. The data for these time/temperature studies appear in Table III below.

EXAMPLE 25

The jacket of a 1-quart double planetary mixer (Charles Ross & Sons model LDM 130) was heated to 190° C. using a circulating oil heater. The mixer was charged with 100 grams of maleamic acid and mixed at maximum power for one hour under subatmospheric pressure (approximately 20 mmHg). Seventy-five grams of fine, pink-colored powdered product was recovered from the mixer. The data for this example appear in Table IV below.

Thermal polymerization of Maleamic Acid in the Presence of a Processing Aid

EXAMPLE 26

Zeolite as a Processing Aid

To a 100-milliliter glass reaction kettle equipped with mechanical stirring and an inlet for nitrogen were charged 10 grams of maleamic acid and 10 grams of zeolite A. The stirrer was turned on, a sweep of nitrogen through the flask was begun and the flask was immersed in an oil bath preheated to 180° C. The contents of the kettle were stirred while maintaining the temperature of the oil bath for 1.5 hours. The contents of the kettle were more easily stirred than reactions done in the absence of the zeolite. The contents of the kettle were allowed to cool to room temperature. The data for this example appear in Table IV below.

EXAMPLE 27

Sodium Sulfate as a Processing Aid

To a 100-milliliter glass reaction kettle equipped with mechanical stirring and an inlet for nitrogen were charged 10 grams of maleamic acid and 10 grams of sodium sulfate. The stirrer was turned on, a sweep of nitrogen through the flask was begun and the flask was immersed in an oil bath preheated to 160° C. The contents of the kettle were stirred while maintaining the temperature of the oil bath for 2 hours. The contents of the kettle were more easily stirred than reactions done in the absence of the sodium sulfate. The contents of the kettle were allowed to cool to room temperature. The data for this example appear in Table IV below.

EXAMPLE 28

Citric Acid as a Processing Aid 5.0 grams of maleamic acid and 0.83 grams of citric acid were ground together in a mortar and pestle. The ground mixture was placed in a glass beaker. The beaker was placed in a muffle furnace at atmospheric pressure preheated to 220° C. for 2 hours. Less foaming was observed as compared to reactions conducted in the muffle furnace in the absence of citric acid. The data for this example appear in Table IV below.

EXAMPLE 29

Polysuccinimide as a Processing Aid 0.5 grams of maleamic acid and 1.5 grams of polysuccinimide were ground together in a mortar and pestle. The ground mixture was placed in a glass beaker. The beaker was placed in a muffle furnace at atmospheric pressure preheated to 220° C. for 2 hours. Less foaming was observed as compared to reactions conducted in the muffle furnace in the absence of polysuccinimide.

Thermal Polymerization of a Solution of Maleamic Acid to form Polysuccinimide

EXAMPLE 30

Dimethyl Sulfoxide as a Solvent

To a 100-milliliter round bottom flask equipped with a mechanical stirrer and an inlet for nitrogen was charged 10 grams of maleamic acid and 10 milliliters of dimethyl sulfoxide. The flask was immersed in an oil bath. The mechanical stirrer was turned on, a sweep of nitrogen through the flask was begun and the oil bath was heated to 210° C. The flask was maintained in the oil bath at 210° C. for 30 minutes. The solution was allowed to cool to room temperature. To the resulting thick, dark brown solution was added 100 milliliters of water. A brown precipitate was formed. The precipitate was collected by filtration and washed with water. The polysuccinimide had a $M_w$ of 1480.

EXAMPLE 31

Sulfolane as a Solvent

To a 100-milliliter round bottom flask equipped with a magnetic stirring bar and an inlet for nitrogen was charged 5 grams of maleamic acid and 20 milliliters of sulfolane. The flask was immersed in an oil bath. The magnetic stirrer was turned on, a sweep of nitrogen through the flask was begun and the oil bath was heated to 180° C. The flask was maintained in the oil bath at 180° C. for 7 hours. The solution was allowed to cool to room temperature. To the resulting thick, dark brown solution was added 25 milliliters of water. A brown precipitate was formed. The precipitate was collected by filtration and washed with water. The polysuccinimide had a $M_w$ of 1,600.

Thermal Polymerization of Suspensions of Maleamic Acid to form Polysuccinimide

EXAMPLE 32

Tetrahydronaphthalene as a Diluent

To a 100-milliliter round bottom flask equipped with a magnetic stirring bar and an inlet for nitrogen was charged 5 grams of maleamic acid and 20 milliliters of tetrahydronaphthalene. The flask was immersed in an oil bath. The magnetic stirrer was turned on, a sweep of nitrogen through the flask was begun and the oil bath was heated to 190° C. The flask was maintained in the oil bath at 190° C. for 7 hours. A brittle foam formed and was subsequently broken by the magnetic stirrer to give a suspension of a red-brown solid. The suspension was allowed to cool to room temperature, was filtered in a Buchner funnel, and washed with acetone to give 4 g of a brown powder. The polysuccinimide had a $M_w$ of 2,100.

Soil Removal and Anti-Redeposition Performance Evaluation

The efficacy of polysuccinimide for clay soil removal and anti-redeposition was evaluated by washing soiled cotton and cotton/terry blended fabrics in the detergent formulation shown in Table I.

Cotton cloth #405 was purchased from Test Fabrics, Inc. (Middlesex, N.J.) and cut to a specified size ($3\frac{1}{2} \times 4\frac{1}{2}''$). The cloths were then soiled by applying from 0.9 to 1.1 grams of a 50% clay slurry (in water) using a China bristle brush (#10). The soil was "painted" onto the cloth inside a 2" diameter circle and allowed to air dry overnight prior to laundering. The clay used to soil the cloths was a reddish-brown particulate clay.

The detergent compositions were tested in a Terg-o-Tometer at the following conditions; 40° C., 100 rpm, 100 ppm hardness (50% city tap water/50% de-ionized water), 12 minute wash with one 3 minute rinse, 1300 ppm detergent and 5 cloths per pot (3 of them soiled). The wash water was pre-heated, the fabric swatches were added and then dissolved detergent (2.6 grams of a 50% slurry in 100 milliliters water) was added. Following the wash period the swatches were wrung, and following the rinse cycle the swatches were wrung again and then air dried. Swatches washed in a detergent containing no polymer were always run as a control.

Reflectance was measured using a Pacific Scientific Colorimeter (Colorgard System 1000) and the data recorded using the L,a,b color scale. Detergent values (E), a measure of soil removal, and whiteness index (W.I.), a measure of antiredeposition, are calculated as:

$$E = ((L_s-L)^2 + (a_s-a)^2 + (b_s-b)^2)^{0.5}$$

$$W.I. = (L/100)*(L-(5.715*b))$$

where $L_s$, $a_s$, and $b_s$ are the reflectivity reading for the soiled swatches and L,a,b are the reflectivity readings for the washed swatches. Each polymer was evaluated in three separate washing experiments. The detergent composition and levels of the components in parts by weight ("pbw") are shown in Table I. This composition was used for the above described performance evaluation and the results of the detergent performance evaluation are listed in Table III. The reflectance of the soiled cloths was measured before laundering so that only cloths of the same reflectance were used in a test. Reflectance was then measured after laundering to evaluate the efficacy of the polysuccinimide in the detergent. The values reported in Table III are the average of the change in detergent and whiteness index of three cloths relative to the control cloths laundered in detergent not containing polymer. Positive numbers indicate an increase in detergent or whiteness index, Additional detergent formulations representative but not limited to possible formulations in which polysuccinimides may be used are shown in Table II.

TABLE I

| WASH CONDITIONS | |
|---|---|
| APPARATUS | Terg-o-tometer washing machine |
| AGITATION | 100 revolutions per minute |
| TEMPERATURE | 40° C. |
| WATER HARDNESS | 100 parts per million ("ppm") |
| WASH CYCLE | 12 minutes |
| RINSE CYCLE | 3 minutes |
| WATER LEVEL | 1 liter |
| DETERGENT DOSAGE | 1300 ppm |
| BALLAST | 5 cloths per load (3 soiled/2 unsoiled) |

| Detergent Composition Used to Evaluate Polysuccinimide for Soil Removal and Anti-Redeposition | |
|---|---|
| Detergent Component | pbw |
| sodium carbonate | 22.0 |
| zeolite A | 16.0 |
| sodium silicate | 2.7 |
| LAS | 8.3 |
| lauryl sulfate | 8.3 |
| sodium sulfate | 34.0 |
| polymer | 3.0 |

TABLE II

Thermal Polymerization of Maleamic Acid in an Oven to form Polysuccinimide

| Example | Temp (°C.) | Time | $M_w$ | $M_n$ | E | W.I. |
|---|---|---|---|---|---|---|
| 1 | 180 | 10 min | 635 | 342 | 2.1 | 3.6 |
| 2 | | 20 min | 1630 | 1390 | 2.7 | 4.4 |
| 3 | | 30 min | 1880 | 1680 | 3.0 | 6.2 |
| 4 | 200 | 2 hr | 1920 | 1710 | 3.6 | 4.7 |
| 5 | | 4 hr | 2120 | 1890 | 3.3 | 3.8 |
| 6 | | | | | | |
| 7 | 210 | 10 min | 1760 | 1550 | 2.9 | 4.1 |
| 8 | | 20 min | 2050 | 1850 | 2.6 | 3.9 |
| 9 | | 30 min | 1910 | 1710 | 3.4 | 4.7 |
| 10 | 240 | 10 min | 2100 | 1890 | 2.5 | 4.7 |
| 11 | | 20 min | 2150 | 1880 | 3.3 | 3.7 |
| 12 | | 30 min | 2120 | 1910 | 2.5 | 4.6 |

TABLE III

Thermal Polymerization of Maleamic Acid in a Heated/Agitated Vessel to form Polysuccinimide

| Example | Temp (°C.) | Time | $M_w$ | $M_n$ | E | W.I. |
|---|---|---|---|---|---|---|
| 13 | 180 | 2 hr | 1820 | 1640 | 2.8 | 3.6 |
| 14 | 200 | 2 hr | 1920 | 1710 | 3.6 | 4.7 |
| 15 | | 4 hr | 2120 | 1890 | 3.3 | 3.8 |
| 16 | 210 | 5 min | 719 | 311 | 3.6 | 3.4 |
| 17 | | 1 hr | 2040 | 1830 | 2.9 | 4.1 |
| 18 | | 2 hr | 2090 | 1880 | 3.2 | 4.4 |
| 19 | | 2 hr | 2180 | 1960 | 2.2 | 4.3 |
| 20 | | 2 hr | 2020 | 1830 | 3.4 | 5.0 |
| 21 | | 3 hr | 2010 | 1810 | 2.2 | 4.3 |
| 22 | | 5 hr | 2140 | 1930 | 3.4 | 5.0 |
| 23 | 240 | 2 hr | 2080 | 1880 | 2.4 | 4.7 |
| 24 | 270 | 2 hr | 2140 | 1930 | 2.8 | 3.5 |

TABLE IV

| Example | Temp (°C.) | Time | Processing Aid | $M_w$ | E | W.I. |
|---|---|---|---|---|---|---|
| 25 | 190 | 1 hr | — | 2000 | 2.8 | 6.2 |
| 26 | 180 | 1.5 hr | zeolite | 2000 | 3.0* | 3.8* |
| 27 | 160 | 2 hr | sodium sulfate | 1900 | 4.0* | 5.5* |

TABLE IV-continued

| Example | Temp (°C.) | Time | Processing Aid | $M_w$ | E | W.I. |
|---|---|---|---|---|---|---|
| 28 | 220 | 2 hr | citric acid | 1800 | 2.6* | 3.9* |

*The product of the reaction of each of these examples was used as is, including the processing aid, at a level of 3 parts by weight of the detergent formulation.

The data in Tables II, III and IV show that maleamic acid heated to a temperature of above 160° C. forms polysuccinimide which is useful as a detergent additive. The data also show that the process of the invention can be carried out with or without mixing, and can be carried out in the presence of one or more processing aids, diluents or solvents.

We claim:

1. A method for producing polysuccinimide comprising:

heating a reaction mixture consisting essentially of maleamic acid and one or more processing aids to a temperature of from about 160° to about 330° C. wherein the one or more processing aids are selected from the group consisting of zeolites, sodium sulfate, sodium silicate, clays, glass beads, silica gel, magnesium stearate, alkylnaphthalenesulfonates, citric acid and polysuccinimide.

2. The method of claim 1 wherein the one or more processing aids are selected from the group consisting of zeolites, sodium sulfate, sodium silicate, and citric acid.

3. The method of claim 4, wherein: the one or more processing aids are present at a level which provides a weight ratio of processing aid to maleamic acid of from about 100:1 to about 1:100.

4. The method of claim 1, wherein: the one or more processing aids are present at a level which provides a weight ratio of processing aid to maleamic acid of from about 50:1 to about 1:50.

* * * * *